(12) United States Patent
Koyanagi (10) Patent No.: US 7,561,616 B2
(45) Date of Patent: Jul. 14, 2009

(54) SYSTEM AND METHOD FOR EQUALIZING HIGH-SPEED DATA TRANSMISSION

(75) Inventor: Yoichi Koyanagi, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 769 days.

(21) Appl. No.: 10/860,515

(22) Filed: Jun. 3, 2004

(65) Prior Publication Data

US 2005/0271134 A1   Dec. 8, 2005

(51) Int. Cl.
*H03H 7/30* (2006.01)
(52) U.S. Cl. .................................................. 375/229
(58) Field of Classification Search ................ 375/229, 375/230, 232, 295, 296; 398/193; 455/114.3
See application file for complete search history.

(56) References Cited

U.S. PATENT DOCUMENTS

| | | | | |
|---|---|---|---|---|
| 5,920,548 A | * | 7/1999 | El Malki | 370/291 |
| 5,999,574 A | * | 12/1999 | Sun et al. | 375/326 |
| 6,256,485 B1 | * | 7/2001 | Heard | 455/161.1 |
| 6,614,842 B1 | * | 9/2003 | Chou et al. | 375/232 |
| 2003/0200243 A1 | * | 10/2003 | Yomo et al. | 708/306 |

OTHER PUBLICATIONS

Zerbe et al., "Equalization and Clock Recovery for a 2.5-10Gb/s 2-PAM/4-PAM Backplane Transceiver Cell," 2003 IEEE International Solid-State Circuits Conference, 10 pages, 2003.

* cited by examiner

*Primary Examiner*—Sam K Ahn
(74) *Attorney, Agent, or Firm*—Baker Botts L.L.P.

(57) ABSTRACT

According to one embodiment of the present invention, a method for equalizing a signal includes receiving a plurality of in incoming data signals. Each of the plurality of incoming data signals have an associated sequence of data. A delay is introduced into the plurality of incoming data signals to generate a plurality of delayed data signals. The one or more combinations of the plurality of incoming data signals and the plurality of delayed data signals are converted into a plurality of high-speed data signals for data transmission

26 Claims, 6 Drawing Sheets

SYSTEM AND METHOD FOR EQUALIZING HIGH-SPEED DATA TRANSMISSION

TECHNICAL FIELD OF THE INVENTION

This invention relates generally to the field of data communications and more specifically to equalizing a signal for high-speed data transmission.

BACKGROUND OF THE INVENTION

A signal transmitted from a transmitter to a receiver typically experiences distortion. To compensate for expected distortion, the transmitter may include an equalizer filter such as a Finite Impulse Response (FIR) filter. Typically, the equalizing filter includes a multiplexer to convert parallel input data to a single higher-speed serial data stream. The equalizing filter also includes delay elements and a mixer. The final output of the equalizing filter is generated as a weighted sum of the multiple delayed versions of the serial data stream. Because the conversion of the data occurs before the delay is introduced, known techniques of equalizing a signal require high-speed circuit components and high-speed processes within the delay module. Consequently, known techniques for equalizing a signal may be unsatisfactory in certain situations.

SUMMARY OF THE INVENTION

In accordance with the present invention, disadvantages and problems associated with previous techniques for equalizing a signal for transmission may be reduced or eliminated.

According to one embodiment of the present invention, a method for equalizing a signal includes receiving a plurality of in incoming data signals. Each of the plurality of incoming data signals have an associated sequence of data. A delay is introduced into the plurality of incoming data signals to generate a plurality of delayed data signals. The one or more combinations of the plurality of incoming data signals and the plurality of delayed data signals are converted into a plurality of high-speed data signals for data transmission.

Certain embodiments of the invention may provide one or more technical advantages. A technical advantage of one embodiment may be that an equalizing filter introduces a delay into incoming signals before the signals are converted into high-speed signals. Accordingly, the circuit components performing the delay process may be operated at slower speeds. In particular embodiments, for example, circuit components performing the delay may operate at a speed that is one-fourth that of the high-speed signals.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
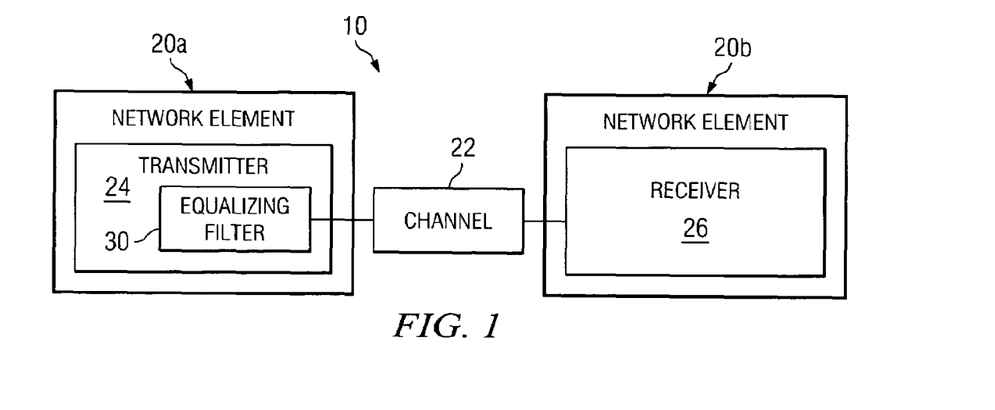
FIG. 1 illustrates one embodiment of a network for the efficient equalizing of high-speed signals.

FIG. 1 illustrates one embodiment of a network 10 for the efficient equalizing of high-speed signals. The transmitter includes an equalizing filter that introduces a delay into incoming signals and converts the delayed signals into high-speed signals. Accordingly, incoming signals are processed first by a delay module and then by a multiplexer module. Because the delay is introduced prior to the conversion of the signals, the circuit components of the delay module may operate at a slower speed. Accordingly, network 10 uses fewer high-speed circuit components to generate an output signal that may be transmitted to other elements in network 10.

According to the illustrated embodiment, network 10 includes network elements 20a-b and a channel 22 coupled as shown in FIG. 1. A network element 20 may comprise an element that transmits and receives data such as a server system, a storage system, a network system, a routing system, or any combination of the proceeding. A server system may include one or more central processing units (CPUs) and one or more memory units. A storage system may include one or more channel adapters (CAs), one or more disk adapters (DAs), and one or more CPU modules (CMs). A routing system may couple network 10 to one or more other networks, which include one or more local area networks (LANs), wide area networks (WANs), or other networks.

Channel 22 may comprise a cable having a length on the order of ten to one hundred meters. In particular embodiments, channel 22 may have length on the order of twenty to forty meters. The speed of a signal traveling through channel 22 may be in the range of multi-gigabits per second. For example, the speed of the signal may be on the order of three gigabits per second. As an example, channel 22 may operate according to the 10 Gigabit Attachment Unit Interface (XAUI) standards, which require a fixed frequency of 3.125 gigabits and is used for 10 Gigabit Ethernet.

Signals traveling at high speeds are susceptible to distortion resulting from an impulse response of channel 22. A received signal may suffer from frequency dependent distortion due to the skin effect and dielectric loss. Frequency dependent distortion may result in interference such as inter-symbol interference (ISI). Multi-gigabit rate communication typically requires a high degree equalization over approximately twenty to forty dB to overcome inter-symbol interference.

Network element 20a includes a transmitter 24, and network element 20b includes a receiver 26. Transmitter 24 transmits a signal through channel 22 to receiver 26. The functions of transmitter 24 and receiver 26 may be performed using software stored on one or more memory units or other computer-readable medium, hardware, other logic, or any suitable combination of the preceding. In various embodiments, transmitter 24 includes an equalizing filter 30. In particular embodiments, equalizing filter 30 may include a FIR filter that adjusts the signal to be transmitted to compensate for expected distortion occurring during transmission. Known equalizing techniques include the conversion of incoming signals into high-speed signals and the introduction of a delay into the high-speed signals. For example, the conversion of incoming signals into high-speed signals may include increasing the rate of transmission of the incoming signals by a factor of four. Where, for example, the incoming signals are received at a frequency of 781.25 MHz, the incoming signals may be converted into high-speed signals of a frequency on the order of 3.125 GHz. Because known techniques introduce the delay into the converted high-speed signals, conventional delay modules require high-speed circuit components that operate on the order of 3.125 GHz.

Figure 2:
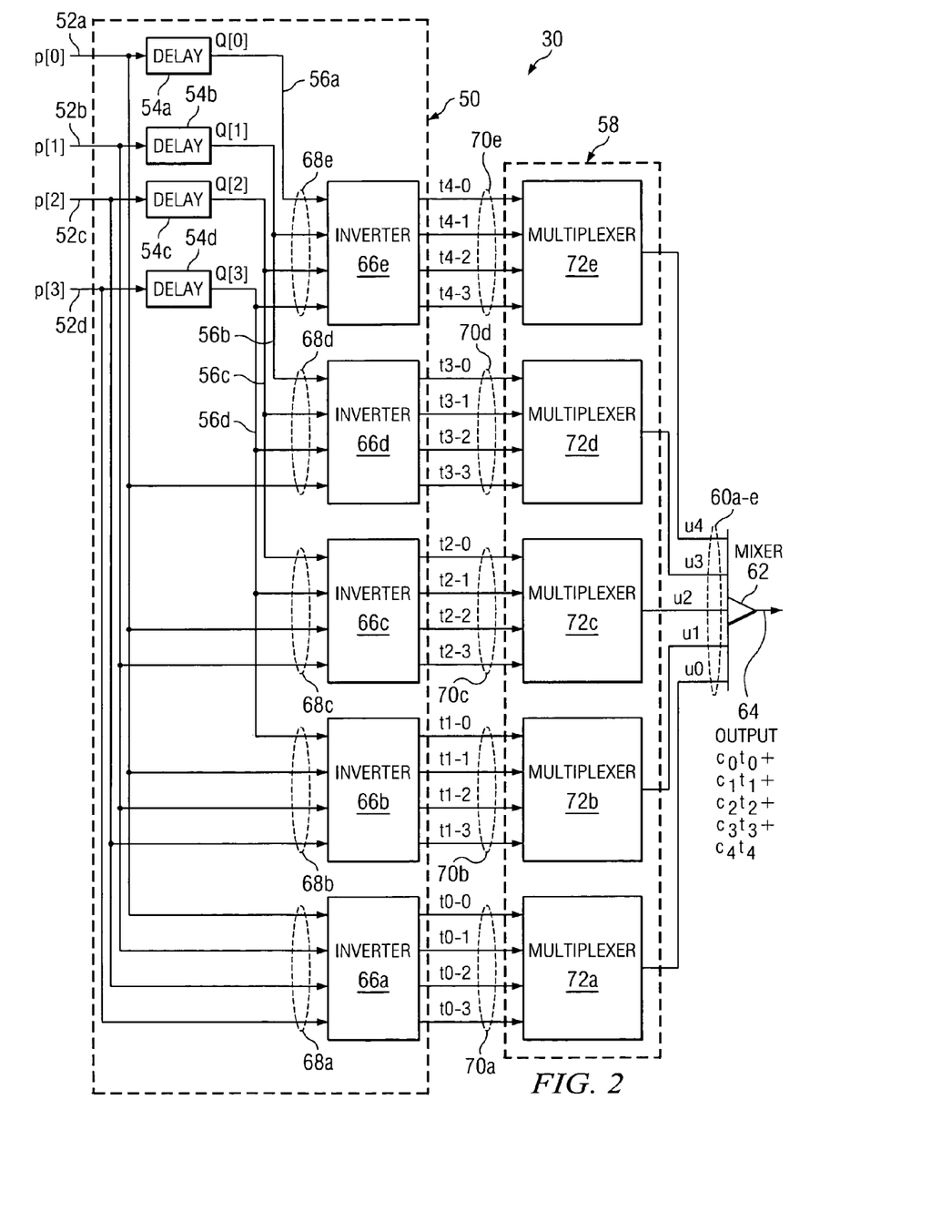
FIG. 2 illustrates one embodiment of an equalizing filter for transmitting high-speed signals.

In various embodiments of the present invention, however, transmitter 24 includes an equalizing filter 30 that operates to introduce a delay into incoming signals prior to the conversion of the incoming signals into high-speed signals. FIG. 2 illustrates one embodiment of an equalizing filter 30 for generating and transmitting delayed high-speed signals. In particular, a delay module 50 of equalizing filter 30 receives multiple incoming signals 52. A desired amount of delay is introduced into incoming signals 52 at delays 54 to generate delayed signals 56. Various combinations of incoming signals 52 and delayed signals 56 are then routed to multiplexer module 58, which operates to convert the various combinations of incoming signals 52 and delayed signals 56 into high-speed signals 60. In particular embodiments, the specific combinations of signals enable equalizing filter 30 to generate high-speed signals 60. High-speed signals 60 may then be summed by a mixer 62 into a high-speed output signal 64, which may be transmitted from equalizing filter 30 of network element 20a to receiver 26 of network element 20b. Although FIG. 2 is illustrated as mixing five combinations of four signals each to generate five high-speed signals 60, the architecture illustrated in FIG. 2 is merely provided as one example of an embodiment of an equalizing filter 30. Any appropriate number of signals may be combined and mixed to generate a desired number of taps.

Figure 3:
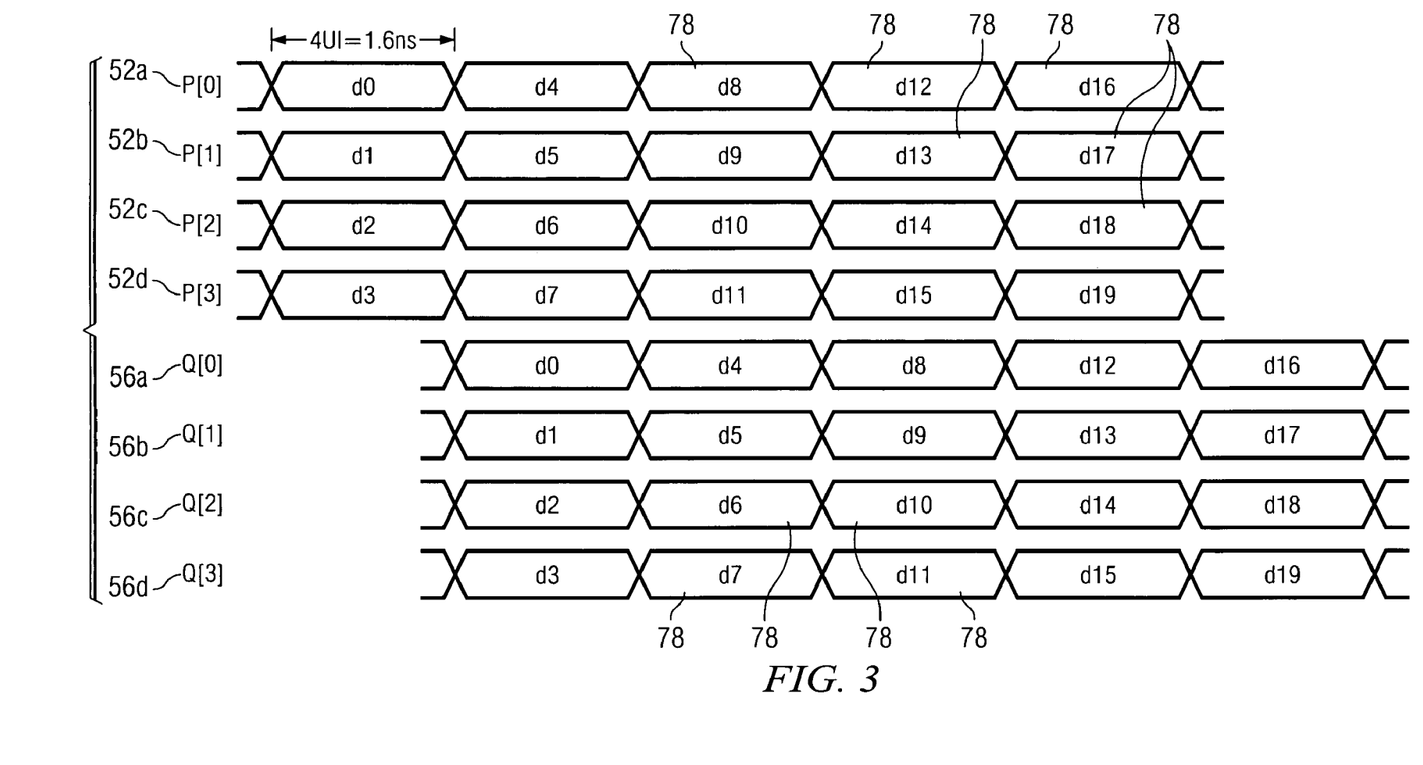
FIG. 3 illustrates example data signals as received and processed by a delay module of the equalizing filter.

In certain embodiments, delay module 50 receives four incoming signals, as indicated by reference numerals 52a-d. Example embodiments of incoming signals 52a-d are illustrated in FIG. 3. Specifically, each incoming signal 52a-d is a sequence of data. The sequence of data may include one or more bits of data that are broken into segments 78. In particular embodiments, incoming signals 52a-d represent a total of twenty segments of data 78, which are represented in FIG. 3 as $d_0$-$d_{19}$. Thus, incoming signals 52a-d each include five segments of data 78. Specifically, incoming signal 52a includes five segments 78 that are designated as $d_0$, $d_4$, $d_8$, $d_{12}$, and $d_{16}$. Incoming signal 52b includes five segments 78 that are designated as $d_1$, $d_5$, $d_9$, $d_{13}$, and $d_{17}$. Incoming signal 52c includes five segments 78 that are designated as $d_2$, $d_6$, $d_{10}$, $d_{14}$, and $d_{18}$. Incoming signal 52d includes five segments 78 that are designated as $d_3$, $d_7$, $d_{11}$, $d_{15}$, and $d_{19}$. In particular embodiments, each segment of data 78 has a rate of transmission on the order of 4UI or 1.28 ns. Although equalizer 30 is described and illustrated as receiving four input signals 52a-d comprised of five segments of data 78 each, it is recognized that equalizer 30 may receive any appropriate number of input signals 52. Additionally, input signals 52 may include any suitable number of segments of data 78. As used in this document, "each" refers to each member of a set or each member of a subset of a set.

Returning to FIG. 2, a portion of each incoming signal 52a-d is directed to at least one of an array of inverters 66a-e. The number of inverters 66 in delay module 50 may be related to the number of taps being used by equalizing filter 30 and compensate for distortion. In the illustrated example, equalizing filter 30 comprises a five tap filter. Accordingly, equalizing filter 30 is shown as including five inverters 66a-c. A portion on incoming signals 52a-d are directed to inverters 66a-e. For example, a first inverter 66a receives a portion of each incoming signal 52a-d. A second inverter 66b receives a portion of first, second, and third incoming signals 52a-c. A third inverter 66c receives a portion of first and second incoming signals 52a-b. A fourth inverter 66d receives a portion of first incoming signal 52a. A fifth inverter 66e does not receive any portion of incoming signals 52a-d. The operation of inverters 66a-e will be described in further detail below.

Each incoming signal 52 is also directed to a delay 54 in delay module 50. As illustrated, each delay 54 may be associated with an incoming signal 52. Thus, where delay module 50 receives four incoming signals 52a-d, delay module 50 may include four associated delays 54a-d. In particular, each delay 54a-d receives an incoming signal 52a-d, respectively. Delays 54a-d introduce a desired amount of delay into each incoming signal 52a-d. The desired amount of delay is expressed in unit intervals (UI). Where the rate of transmission of the data is on the order of 3.125 Gbps, a UI may be equal to 0.32 ns. The amount of delay is related to the functionality of multiplexer module 58. For example, where equalizing filter 30 includes a 4-to-1 multiplexer, delay 54a operates to introduce a delay of 4UI, or 1.28 ns, into incoming signal 52a to generate delayed data signal 56a. Delays 54b, 54c, and 54d operate similarly. In other examples, equalizing filter 30 may include an 8-to-1 or a 16-to-1 multiplexer. Accordingly, in various embodiments delays 54a-d may operate to introduce a delay on the order of 1 to 10 ns.

Example embodiments of delay signals 56a-d are illustrated in FIG. 3. As explained above, delay 54a introduces a delay of 4UI, or 1.28 ns, into incoming signal 52a to generate delay signal 56a. Accordingly, delay signal 56a includes a sequence of data that includes five segments of data 78 designated in FIG. 3 as $d_0$, $d_4$, $d_8$, $d_{12}$, and $d_{16}$. In the illustrated example of FIG. 3, however, each segment 78 in delay signal 56a is 4UI, or 1.28 ns behind the corresponding segment 78 in incoming signal 52a. Delay signals 56b-d are illustrated similarly. Specifically, delay signal 56b includes segments of data 78 designated as $d_1$, $d_5$, $d_9$, $d_{13}$, and $d_{17}$. Each segment 78 in delay signal 56b is 4UI or 1.28 ns behind the corresponding segment 78 in incoming signal 52b. Delay signal 56c includes segments 78 designated as $d_2$, $d_6$, $d_{10}$, $d_{14}$, and $d_{18}$. Each segment 78 of delay signal 56c is 4UI or 1.28 ns behind corresponding segment 78 in incoming signal 52c. Delay signal 56d includes segments 78 designated as $d_3$, $d_7$, $d_{11}$, $d_{15}$, and $d_{19}$. Each segment 78 in delay signal 56d is 4UI or 1.28 ns behind the corresponding segment 78 in incoming signal 56d.

Returning again to FIG. 2, delayed data signals 56a-d may be routed to inverters 66a-d. Accordingly, each inverter 66a-e receives a combination of incoming signals 52a-d and/or delay signals 56a-d. Specifically, first inverter 66a receives a first combination of signals 68a. First combination of signals 68a includes a portion of each incoming signal 52a-d. Second inverter 66b receives a second combination of signals 68b, which includes a portion of each incoming signal 52a-c and a portion of delay signal 54d. Third inverter 66c receives a third combination of signals 68c, which includes a portion of each incoming signal 52a-b and a portion of each delay signal 54c-d. Fourth inverter 66d receives a fourth combination of signals 68d, which includes a portion of incoming signal 52a and a portion of each delay signal 56b-d. Fifth inverter 66e receives a fifth combination of signals 68e. Fifth combination of signals 68e includes a portion of each delay signal 56a-d. The particular routing schema illustrated in FIG. 2, however, is merely exemplary. It is recommended that inverters 66a-e may receive any appropriate combination of incoming signals 52a-d and/or delayed signals 56a-d.

Equalizer 30 may associate a coefficient parameter with each incoming signal 52a-d and delayed signal 56a-d received by inverters 66a-e. The coefficient parameters may be positive or negative and are independent of one another. The number of coefficient parameters is equal to the number of taps of equalizing filter 30. In operation, inverters 66a-e are configured to invert the polarity of the received signals where the coefficient parameters indicate that conversion is appropriate. The inversion function for equalizer 30 may be as follows:

Where the coefficient parameter of a particular tap for a given incoming signal 52 or delayed signal 50 is negative, the inverter 66 associated to the tap may invert the polarity of the received signal. On the other hand, where the coefficient parameter for a received signal is positive, the inverter 66 that is receiving the signal may not operate to invert the polarity of the received signal.

The inversion of combinations of signals 68 at inverters 66 results in combinations of signals 70. In the simplest example, the coefficient parameters associated with each signal received at inverters 66 results in the signals being unchanged. Accordingly, for example purposes only, it will be assumed combinations of signals 70 are identical to combinations of signals 68.

After leaving inverters 66a-e, combinations of signals 70 are transmitted from delay module 50 to multiplexer module 58. Multiplexer module 58 includes an array of multiplexers 72. Each multiplexer 72 receives a combination of signals 70 and converts the combination of signals into a high-speed signal 60. In particular embodiments, multiplexers 72 may include 4-to-1 multiplexers that are configured to convert four lower speed input signals into one high-speed output signal. For example, multiplexers 72a-e may receive combinations of signals 70a-e, respectively, and convert the combinations of signals 70a-e into high-speed signals 60a-e, respectively. High-speed signals 60a-e are represented in FIG. 2 by $u_0$ through $u_4$.

Figure 4A:
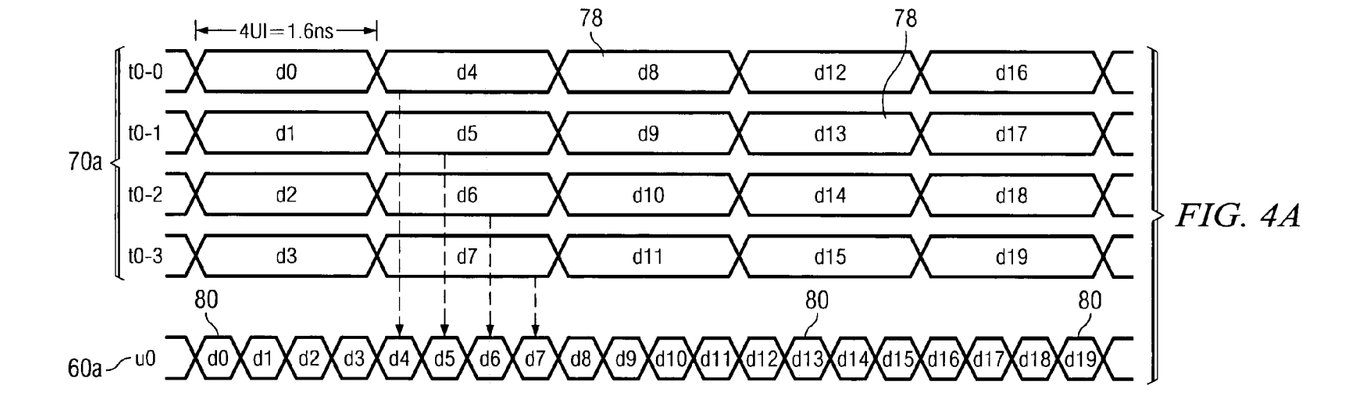
FIGS. 4A-4E illustrate example data signals as received and processed by a multiplexer module of the equalizing filter.

Example embodiments of the conversion of combinations of signals 70a-e into high-speed signals 60a-e are illustrated in FIGS. 4A-4E. Specifically, FIG. 4a illustrates the conversion of a first combination of signals 70a into a first high-speed signal 60a. In operation, first multiplexer 72a receives first combination of signals 70a, which are represented by $t_{0-0}$ through $t_{0-3}$. Where first combination of signals 70a is identical to first combination of signals 68a, signals $t_{0-0}$ through $t_{0-3}$ include a portion of each incoming signal 52a-d but do not include any delayed signals 56a-d. First multiplexer 72a converts first combination of signals 70a into first high-speed signal 60a, which is depicted as $u_0$.

As illustrated, first high-speed signal 60a ($u_0$) includes a sequence of data that includes at least one segment 80. Because a delay has not been introduced into the signals in first combination of signals 70, the number of segments 80 in high-speed signal 60a ($u_0$) corresponds to the total number of segments 78 in first combination of signals 70a. Accordingly, where, as illustrated, first combination of signals 70a includes twenty segments of data 78 ($d_0$-$d_{19}$), first high-speed signal 60a also includes twenty high-speed segments of data 80 ($d_0$-$d_{19}$). In particular embodiments, the rate of transmission of high-speed signal 60a may be four times that of the signals in first combination of signals 70a. Accordingly, where the rate of transmission of incoming signals 52a-d ($P_0$-$P_3$) is on the order of 781.25 MHz, the rate of transmission of high-speed signal 60a may be of a frequency on the order of 3.125 GHz. The segments 80 of data in first high-speed signal 60a are sequenced such that the first high-speed segment is taken from $t_{0-0}$, the second high-speed segment is taken from $t_{0-1}$, the third high-speed segment is taken from $t_{0-2}$, the fourth high-speed segment is taken from $t_{0-3}$, and so on.

Figure 4B:
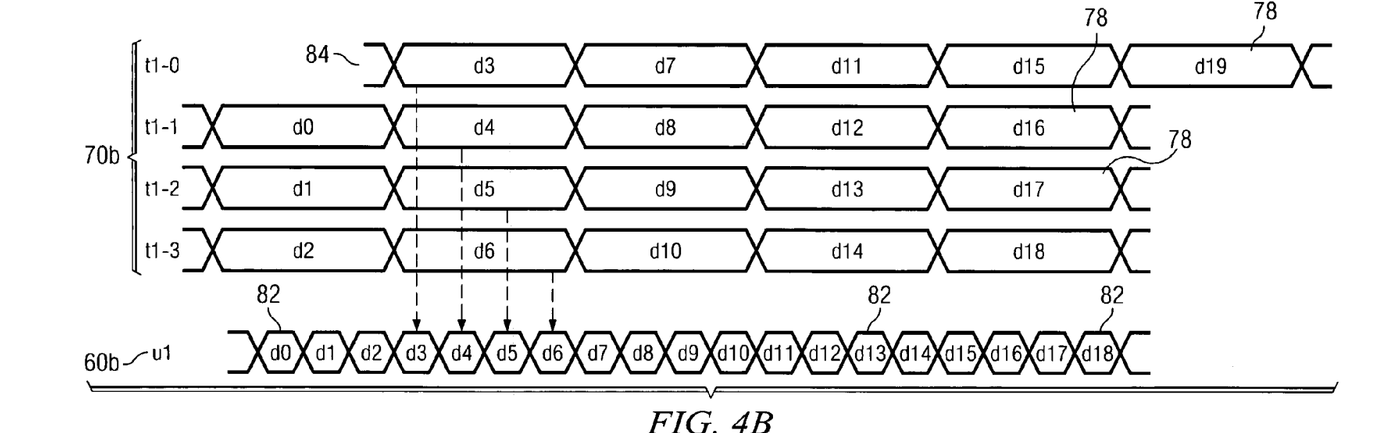

FIG. 4b illustrates the conversion of a second combination of signals 70b into a second high-speed signal 60b. In operation, second multiplexer 72b receives second combination of signals 70b, which are represented by $t_{1-0}$ through $t_{1-3}$. Where second combination of signals 70b is identical to second combination of signals 68b, signals $t_{1-0}$ through $t_{1-3}$ include a portion of each incoming signal 52a-c ($P_0$-$P_2$) and a portion of delay signal 54d ($Q_3$). Second multiplexer 72b converts second combination of signals 70b into second high-speed signal 60b, which is depicted as $u_1$.

As illustrated, second high-speed signal 60b ($u_1$) includes a sequence of data that includes at least one segment 82. Because second combination of signals 70b includes fourth delay signal 56d ($Q_3$), high-speed signal 60b ($u_1$) includes nineteen segments of data 82 ($d_0$-$d_{18}$). However, because delayed signal 56d ($Q_3$) includes one delay segment 84, second high-speed signal 60b ($u_1$) is delayed by the equivalent of one high-speed segment. If, for example, delay segment 84 is on the order of 4UI, or 1.28 ns, second high-speed signal 60b ($u_1$) may be delayed by 1UI, or 0.32 ns. In particular embodiments, the rate of transmission of second high-speed signal 60b may be four times that of combination of signals 70b. Accordingly, where the rate of transmission of incoming signals 52a-d ($P_0$-$P_3$) and delayed signals 56a-d ($Q_0$-$Q_3$) is on the order of 781.25 MHz, the rate of transmission of second high-speed signal 60b may be of a frequency on the order of 3.125 GHz. The segments of data in second high-speed signal 60b are sequenced such that the first high-speed segment is taken from $t_{1-0}$, the second high-speed segment is taken from $t_{1-1}$, the third high-speed segment is taken from $t_{1-2}$, the fourth high-speed segment is taken from $t_{1-3}$, and so on.

Figure 4C:
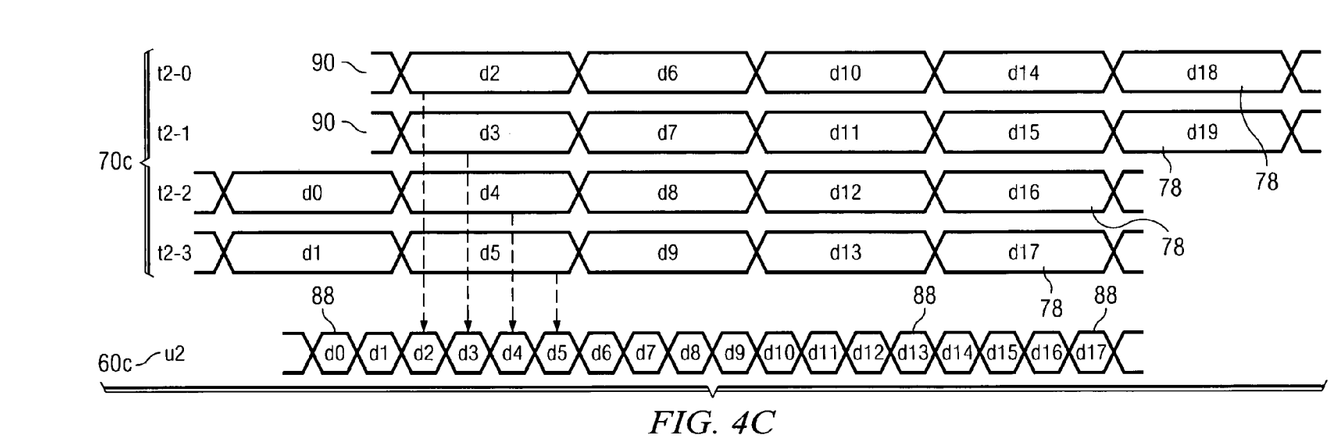

FIG. 4c illustrates the conversion of a third combination of signals 70c into a third high-speed signal 60c. In operation, third multiplexer 72c receives third combination of signals 70c, which are represented by $t_{2-0}$ through $t_{2-3}$. Where third combination of signals 70c is identical to third combination of signals 68c, signals $t_{2-0}$ through $t_{2-3}$ include a portion of each incoming signal 52a-b ($P_0$-$P_1$) and a portion of each delay signal 54c-d ($Q_2$-$Q_3$). Third multiplexer 72c converts third combination of signals 70c into third high-speed signal 60c ($u_2$), which is depicted as $u_2$.

As illustrated, third high-speed signal 60c ($u_2$) includes a sequence of data that includes at least one segment 88. Because third combination of signals 70c includes third and fourth delayed signals 56c-d ($Q_2$ and $Q_3$), third high-speed signal 60c ($u_2$) includes eighteen segments of data 88 ($d_0$-$d_{17}$). However, because delayed signals 56c-d ($Q_2$ and $Q_3$) each include one delay segment 90, third high-speed signal 60c ($u_2$) is delayed by the equivalent of two high-speed segments. If, for example, delay segments 90 are on the order of 4UI, or 1.28 ns, third high-speed signal 60c ($u_2$) may be delayed by 2UI or 0.64 ns. In particular embodiments, the rate of transmission of third high-speed signal 60c may be four times that of third combination of signals 70c. Accordingly, where the rate of transmission of incoming signals 52a-d ($P_0$-$P_3$) and delayed signals 56a-d ($Q_0$-$Q_3$) is on the order of 781.25 MHz, the rate of transmission of third high-speed signal 60c may be on the order of 3.125 GHz. The segments of data in third high-speed signal 60c are sequenced such that the first high-speed segment is taken from $t_{2-0}$, the second high-speed segment is taken from $t_{2-1}$, the third high-speed segment is taken from $t_{2-2}$, the fourth high-speed segment is taken from $t_{2-3}$, and so on.

Figure 4D:
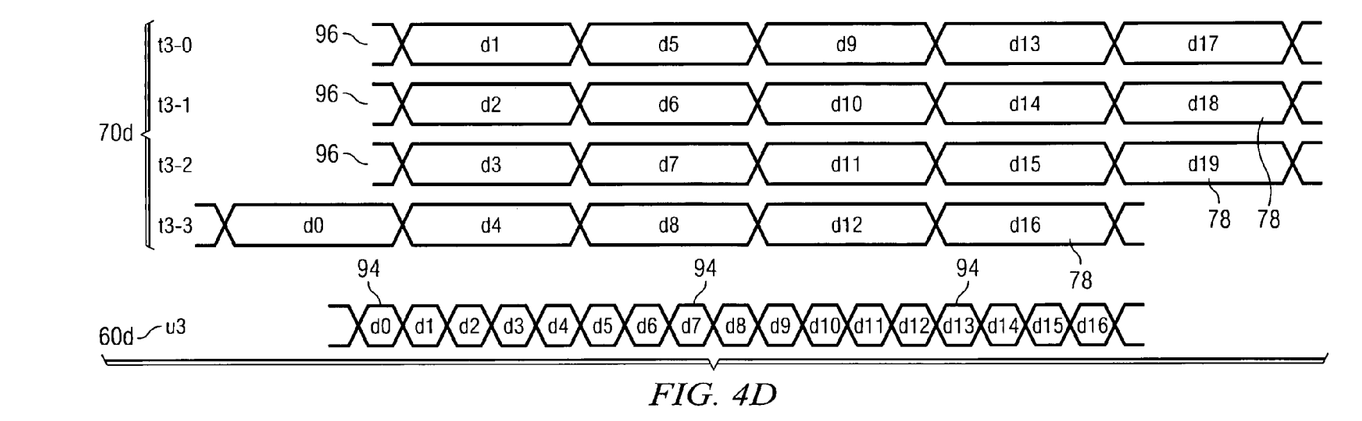

FIG. 4d illustrates the conversion of a fourth combination of signals 70d into a fourth high-speed signal 60d. In operation, fourth multiplexer 72d receives a fourth combination of signals 70d, which are represented by $t_{3-0}$ through $t_{3-3}$. Where fourth combination of signals 70d is identical to fourth combination of signals 68d, signals $t_{3-0}$ through $t_{3-3}$ include a portion of incoming signal 52a ($P_0$) and a portion of each delay signal 56b-d ($Q_1$-$Q_3$). Fourth multiplexer 72d converts fourth combination of signals 70d into fourth high-speed signal 60d, which is depicted as $u_3$.

As illustrated, fourth high-speed signal 60d ($U_3$) includes a sequence of data that includes at least one segment 94. Because fourth combination of signals 70d includes second, third, and fourth delayed signals 56b-d ($Q_1$-$Q_3$), fourth high-speed signal 60d ($u_3$) includes seventeen segments of data 94 ($d_0$-$d_{16}$) However, because delayed signals 56b-d ($Q_1$-$Q_3$) each include one delay segment 96, fourth high-speed signal 60d ($u_3$) is delayed by the equivalent of three high-speed segments. If, for example, delay segments 90 are on the order of 4UI, or 1.28 ns, fourth high-speed signal 60d ($u_3$) may be delayed by 3UI, or 0.96 ns. In particular embodiments, the rate of transmission of fourth high-speed signal 60d may be four times that of fourth combination of signals 70d. Accordingly, where the rate of transmission of incoming signals 52a-d ($P_0$-$P_3$) and delayed signals 56a-d ($Q_0$-$Q_3$) is on the order of 781.25 MHz, the rate of transmission of fourth high-speed signal 60d may be on the order of 3.125 GHz. The high-speed segments 94 of data in fourth high-speed signal 60d are sequenced such that the first high-speed segment is taken from $t_{3-0}$, the second high-speed segment is taken from $t_{3-1}$, the third high-speed segment is taken from $t_{3-2}$, the fourth high-speed segment is taken from $t_{3-3}$, and so on.

Figure 4E:
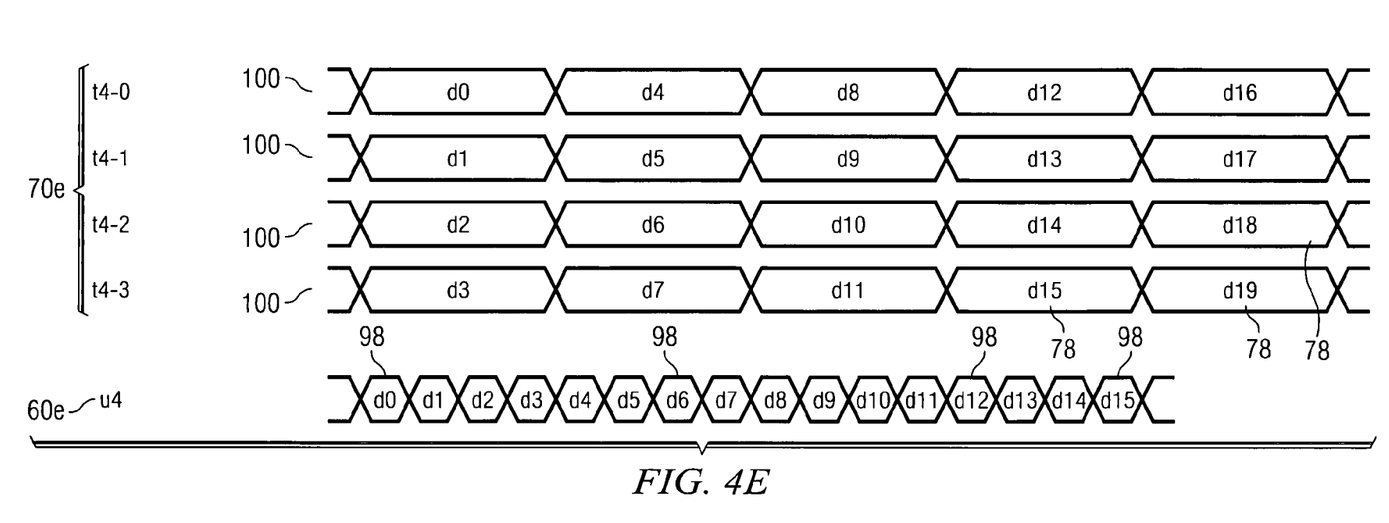

FIG. 4e illustrates the conversion of a fifth combination of signals 70e into a fifth high-speed signal 60e. In operation, fifth multiplexer 72e receives a fifth combination of signals 70e, which are represented by $t_{4-0}$ through $t_{4-3}$. Where fifth combination of signals 70e is identical to fifth combination of signals 68e, signals $t_{4-0}$ through $t_{4-3}$ include a portion of each delay signal 56a-d ($Q_0$-$Q_3$) but do not include any incoming signals 52a-d ($P_0$-$P_3$). Fifth multiplexer 72e converts fifth combination of signals 70e into fifth high-speed signal 60e, which is depicted as $u_4$.

As illustrated, fifth high-speed signal 60e ($u_4$) includes a sequence of data that includes at least one high-speed segment 98. Because fifth combination of signals 70e includes first through fourth delayed signals 56a-d ($Q_0$-$Q_3$), fifth high-speed signal 60e ($u_4$) includes sixteen segments of data 98 ($d_0$-$d_{15}$). However, because delayed signals 56a-d ($Q_0$-$Q_3$) each include one delayed segment 100, fifth high-speed signal 60e ($u_4$) is delayed by the equivalent of four high-speed segments. If, for example, delay segments 100 are on the order of 4UI, or 1.28 ns, fourth high-speed signal 60e ($u_4$) may be delayed 4UI, or 1.28 ns. In particular embodiments, the rate of transmission of fifth high-speed signal 60e may be four times that of fifth combination of signals 70e. Accordingly, where the rate of transmission of delayed signals 56a-d ($Q_0$-$Q_3$) is on the order of 781.25 MHz, the rate of transmission of fifth high-speed signal 60e may be on the order of 3.125 GHz. The high-speed segments 98 of data in fifth high-speed signal 60e are sequenced such that the first high-speed segment is taken from $t_{4-0}$, the second high-speed segment is taken from $t_{4-1}$, the third high-speed segment is taken from $t_{4-2}$, the fourth high-speed segment is taken from $t_{4-3}$, and so on.

Thus, in the manner described above with regard to FIGS. 4A-4E, multiplexer module 58 generates high-speed signals 60a-e. Returning to FIG. 2, high-speed signals 60a-e are transmitted to mixer 62, which sums high-speed signals 60a-e to generate output signal 64. In the illustrated example, the output comprises $C_0 t_0 + C_1 t_1 + C_2 t_2 + C_3 t_3 + C_4 t_4$, where $C_{0-4}$ represent the coefficient parameters associated with high-speed signals 60a-e, respectively. Output signal 64 is transmitted through channel 22 to receiver 26.

Figure 5:
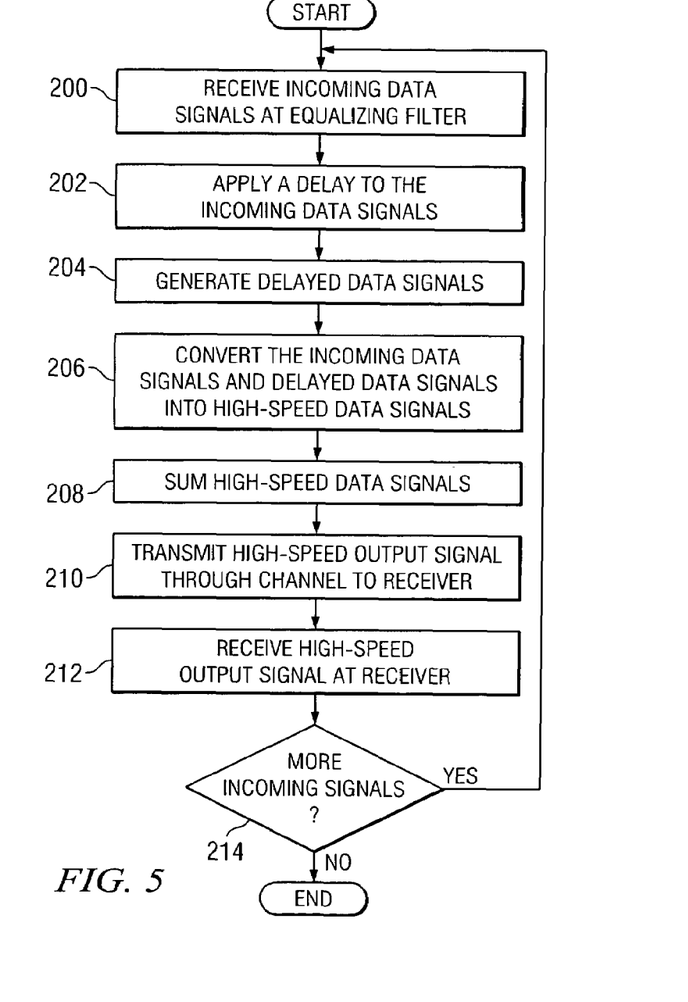
FIG. 5 illustrates a flowchart of one embodiment of a method for the generation of high-speed signals.

FIG. 5 illustrates a flowchart of one embodiment of a method for the generation of high-speed signals. The method begins at step 200, where equalizing filter 30 at transmitter 24 receives incoming signals 52. In particular embodiments, incoming signals 52 may be received at a frequency of 781.25 MHz. Equalizing filter 30 introduces a delay to the incoming data signals at step 202. The introduction of the desired amount of delay may be performed by an array of delays 54, which are each associated with an incoming signal 52. In particular embodiments, delays 54 may operate to introduce a delay of 4UI, or 1.28 ns, delay into each incoming signal 52. Specifically, the delay may be on the order of 4UI or 1.28 ns. The application of the desired amount of delay results in the generation of delayed data signals 56 at step 204.

At step 206, equalizing filter 30 converts one or more combinations 70 of incoming data signals 52 and delayed signals 56 into multiple high-speed data signals 60. In particular embodiments, the rate of transmission of high-speed data signals 60 may be increased by a factor of four. For example, where the rate of transmission of incoming signals 52 and delayed signals is on the order of 781.25 MHz, incoming signals 52 may be converted into high-speed data signals 60 of a frequency on the order of 3.125 GHz. The conversion of the combinations 70 of incoming signals 52 and delayed signals 56 is performed by multiplexer module 58, which may include an array of multiplexers 72. For example, in particular embodiments, multiplexer module 58 may include five multiplexers 72a-e. Each multiplexer 72a-e may receive a different combination of incoming signals 52 and/or delayed signals 56. The specific combinations of signals received by multiplexer module 58 may enable equalizing filter 30 to generate five high-speed signals 60 from four incoming data signals 52.

In certain embodiments, the combinations of incoming signals 52 and delayed signals 56 may be inverted by an array of inverters 66 that operate to reverse the polarity of incoming signals 52 and delayed signals 56. The inversion of incoming signals 52 and delayed signals 56 may be based on the coefficient parameters of equalizing filter 30. Where incoming signals 52 and delayed signals 56 are processed by inverters 66, the combinations of inverted signals may be received by multiplexer module 58 where the combination of signals are converted into high-speed signals 60 in the manner described above.

High-speed data signals 60 are summed at step 208. The summation of high-speed data signals 60 may be performed by mixer 62. In particular embodiments, the summation results in output signal 64, which comprises $C_0 t_0 + C_1 t_1 + C_2 t_2 + C_3 t_3 + C_4 t_4$. At step 210, output signal 64 is transmitted through channel 22 to receiver 26. In certain embodiments, output signal 64 may be transmitted at a rate on the order of 3.125 GHz. Receiver 26 receives output signal 64 at step 212. Receiver 26 processes output signal 64 in order to obtain a recovered data sequence from output signal 64. At step 214, a determination is then made at equalizing filter 30 as to whether or not there are additional incoming signals 52 being received at equalizer 30. If it is determined that additional incoming signals 52 are being received at step 214, the method returns to step 200, where equalizing filter 30 receives additional incoming signals 52. If it is determined that no additional signals 52 are being received at step 214, the method terminates.

Steps may be modified, added, or omitted without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:

1. A method for equalizing a signal, comprising:
    receiving a plurality of in incoming data signals, each of the plurality of incoming data signals having an associated sequence of data;
    introducing a delay into the plurality of incoming data signals to generate a plurality of delayed data signals;
    routing one or more combinations of the plurality of incoming data signals without the delay and the plurality of delayed data signals to a multiplexer module; and
    equalizing the one or more combinations of data signals by converting, at the multiplexer module, the one or more combinations of the plurality of incoming data signals without the delay and the plurality of delayed data signals into a plurality of high-speed data signals for data transmission.

2. The method of claim 1, wherein each sequence of data associated with each of the plurality of incoming data signals comprises a plurality of data segments.

3. The method of claim 2, wherein each of the plurality of data segments has a rate of transmission on the order of 1 to 10 ns.

4. The method of claim 2, wherein the delay is equal to a rate of transmission of one data segment.

5. The method of claim 1, wherein converting the one or more combinations of the plurality of incoming data signals and the plurality of delayed data signals comprises increasing the rate of transmission of the one or more combinations by a factor of four.

6. The method of claim 1, wherein the one or more combinations of incoming data signals and delayed data signals comprise:
    a first combination comprising each of the plurality of incoming data signals;
    a second combination comprising each of the plurality of delayed data signals; and
    at least one other combination comprising at least one of the plurality of incoming data signals and at least one of the plurality of delayed data signals.

7. The method of claim 1, wherein the one or more combinations of incoming data signals and delayed data signals comprise:
    a first combination of each of the plurality of incoming data signals;
    a second combination of incoming data signals and delayed data signals;
    a third combination of incoming data signals and delayed data signals;
    a fourth combination of incoming data signals and delayed data signals; and
    a fifth combination of each of the plurality of delayed signals.

8. The method of claim 7, wherein:
    the second combination comprises three incoming data signals and one delayed signal;
    the third combination comprises two incoming data signals and two delayed signals; and
    the fourth combination comprises one incoming data signal and three delayed signals.

9. A system for equalizing a signal, comprising:
    a delay module operable to:
    receive a plurality of in incoming data signals, each of the plurality of incoming data signals having an associated sequence of data;
    introduce a delay into the plurality of incoming data signals to generate a plurality of delayed data signals; and
    generate one or more combinations of the plurality of delayed data signals and the plurality of incoming data signals without the delay; and
    a multiplexer module operable to:
    receive the one or more combinations of the plurality of delayed data signals and the plurality of incoming data signals without the delay; and
    equalize the one or more combinations of data signals by converting the one or more combinations into a plurality of high-speed data signals for data transmission.

10. The system of claim 9, wherein each sequence of data associated with each of the plurality of incoming data signals comprises a plurality of data segments.

11. The system of claim 10, wherein the delay module is operable to receive each of the plurality of data segments at a rate of transmission on the order of 1 to 10 ns.

12. The system of claim 10, wherein the delay is equal to a rate of transmission of one data segment.

13. The system of claim 9, wherein the multiplexer module is operable to convert the one or more combinations of incoming data signals and delayed data signals by increasing the rate of transmission of the one or more combinations by a factor of four.

14. The system of claim 9, wherein the one or more combinations of incoming data signals and delayed data signals comprise:
    a first combination comprising each of the plurality of incoming data signals;
    a second combination comprising each of the plurality of delayed data signals; and
    at least one other combination comprising at least one of the plurality of incoming data signals and at least one of the plurality of delayed data signals.

15. The system of claim 9, wherein the one or more combinations of incoming data signals and delayed data signals comprise:
    a first combination of each of the plurality of incoming data signals;
    a second combination of incoming data signals and delayed data signals;
    a third combination of incoming data signals and delayed data signals;
    a fourth combination of incoming data signals and delayed data signals; and a fifth combination of each of the plurality of delayed signals.

16. The system of claim 15, wherein:
the second combination comprises three incoming data signals and one delayed signal;
the third combination comprises two incoming data signals and two delayed signals; and
the fourth combination comprises one incoming data signal and three delayed signals.

17. Software for equalizing a signal, the software embodied in a computer-readable medium and operable when executed by a computer to:
receive a plurality of in incoming data signals, each of the plurality of incoming data signals having an associated sequence of data;
introduce a delay into the plurality of incoming data signals to generate a plurality of delayed data signals;
route one or more combinations of the plurality of incoming data signals without the delay and the plurality of delayed data signals to a multiplexer module; and
equalize the one or more combinations of data signals by converting at the multiplexer module, the one or more combinations of the plurality of incoming data signals without the delay and the plurality of delayed data signals into a plurality of high-speed data signals for data transmission.

18. The software of claim 17, wherein each sequence of data associated with each of the plurality of incoming data signals comprises a plurality of data segments.

19. The software of claim 18, wherein each of the plurality of data segments is received at a rate of transmission on the order of 1 to 10 ns.

20. The software of claim 18, wherein the delay is equal to a rate of transmission of one data segment.

21. The software of claim 17, wherein when converting the one or more combinations of the plurality of incoming data signals and the plurality of delayed data signals the logic is operable to increase the rate of transmission of the one or more combinations by a factor of four.

22. The software of claim 17, wherein the one or more combinations of incoming data signals and delayed data signals comprise:
a first combination comprising each of the plurality of incoming data signals;
a second combination comprising each of the plurality of delayed data signals; and
at least one other combination comprising at least one of the plurality of incoming data signals and at least one of the plurality of delayed data signals.

23. The software of claim 17, wherein the one or more combinations of incoming data signals and delayed data signals comprise:
a first combination of each of the plurality of incoming data signals;
a second combination of incoming data signals and delayed data signals;
a third combination of incoming data signals and delayed data signals;
a fourth combination of incoming data signals and delayed data signals; and
a fifth combination of each of the plurality of delayed signals.

24. The software of claim 23, wherein:
the second combination comprises three incoming data signals and one delayed signal;
the third combination comprises two incoming data signals and two delayed signals; and
the fourth combination comprises one incoming data signal and three delayed signals.

25. A system for equalizing a signal, comprising:
means for receiving a plurality of in incoming data signals, each of the plurality of incoming data signals having an associated sequence of data;
means for introducing a delay into the plurality of incoming data signals to generate a plurality of delayed data signals;
means for routing one or more combinations of the plurality of incoming data signals without the delay and the plurality of delayed data signals to a multiplexer module; and
means for equalizing the one or more combinations of data signals by converting, at the multiplexer module, the one or more combinations of the plurality of incoming data signals without the delay and the plurality of delayed data signals into a plurality of high-speed data signals for data transmission.

26. A method for equalizing a signal, comprising:
receiving a plurality of in incoming data signals, each of the plurality of incoming data signals having an associated sequence of data, each sequence of data associated with each of the plurality of incoming data signals comprising a plurality of data segments;
introducing a delay into the plurality of incoming data signals to generate a plurality of delayed data signals, the delay equal to the rate of transmission of one data segment and on the order of 1 to 10 ns; and
equalizing the one or more combinations of data signals by converting one or more combinations of the plurality of incoming data signals and the plurality of delayed data signals into a plurality of high-speed data signals for data transmission, wherein the one or more combinations of incoming data signals and delayed data signals comprise:
a first combination including each of the plurality of incoming data signals;
a second combination including three incoming data signals and one delayed signal;
a third combination including two incoming data signals and two delayed signals;
a fourth combination including one incoming data signal and three delayed signals; and
a fifth combination including each of the plurality of delayed signals.

* * * * *

UNITED STATES PATENT AND TRADEMARK OFFICE
CERTIFICATE OF CORRECTION

| | | |
|---|---|---|
| PATENT NO. | : 7,561,616 B2 | Page 1 of 1 |
| APPLICATION NO. | : 10/860515 | |
| DATED | : July 14, 2009 | |
| INVENTOR(S) | : Yoichi Koyangi | |

It is certified that error appears in the above-identified patent and that said Letters Patent is hereby corrected as shown below:

Col. 3, Ln. 51: After "$d_1, d_5$," delete "$d_0$" and insert --$d_9$--.

Signed and Sealed this

Second Day of March, 2010

David J. Kappos
*Director of the United States Patent and Trademark Office*